United States Patent [19]

Grotz et al.

[11] Patent Number: 4,554,135
[45] Date of Patent: Nov. 19, 1985

[54] AMMONIA CONVERTER

[75] Inventors: Bernard J. Grotz, Pasadena; Fiske O. Parnkopf, Arcadia; G. Robert Prescott, Newport Beach, all of Calif.

[73] Assignee: C F Braun & Co., Alhambra, Calif.

[21] Appl. No.: 444,749

[22] Filed: Nov. 26, 1982

[51] Int. Cl.[4] ............................................. C01C 1/04
[52] U.S. Cl. .................................. 422/148; 422/198; 422/211; 422/240; 423/360
[58] Field of Search ............... 422/148, 198, 208, 211, 422/240; 165/158, DIG. 8; 423/360

[56] References Cited

U.S. PATENT DOCUMENTS

| | | | |
|---|---|---|---|
| 1,689,684 | 10/1928 | Reed | 422/148 |
| 1,960,386 | 5/1934 | Lopez | 422/148 |
| 2,109,118 | 2/1938 | Naumann | 422/240 X |
| 2,339,368 | 1/1944 | Bagsar | 422/240 X |
| 2,448,462 | 8/1948 | Rezoni | 422/240 X |
| 3,704,699 | 12/1972 | Mevenkamp | 122/7 R |
| 3,721,532 | 3/1973 | Wright et al. | 165/67 X |
| 3,892,535 | 7/1975 | Hennel et al. | 422/148 |
| 4,060,389 | 11/1977 | Nishimura et al. | 422/240 |
| 4,065,492 | 12/1977 | Spielberger et al. | 422/240 X |
| 4,379,124 | 4/1983 | Fouguet | 422/240 |

FOREIGN PATENT DOCUMENTS

| | | | |
|---|---|---|---|
| 0025499 | 3/1976 | Japan | 422/148 |
| 0020387 | 2/1977 | Japan | 422/240 |
| 0033482 | 4/1981 | Japan | 422/240 |
| 0116755 | 7/1982 | Japan | 422/240 |
| 0116756 | 7/1982 | Japan | 422/240 |

OTHER PUBLICATIONS

A. V. Slack and G. Russell James, *Ammonia*, Part III, 1977, pp. 197-205, 291-369.

Primary Examiner—Barry S. Richman
Assistant Examiner—William R. Johnson
Attorney, Agent, or Firm—Lyon & Lyon

[57] ABSTRACT

Apparatus for synthesizing ammonia from an ammonia feed gas passing to an ammonia synthesis converter from a horizontally disposed heat exchanger. The synthesis converter comprising a shell and catalyst holder positioned within and spaced slightly from the shell to provide an annular passageway therebetween, is close coupled through a channel to a heat exchanger and a conduit extends through the channel and is adapted to be connected to the tube side of the heat exchanger.

1 Claim, 1 Drawing Figure

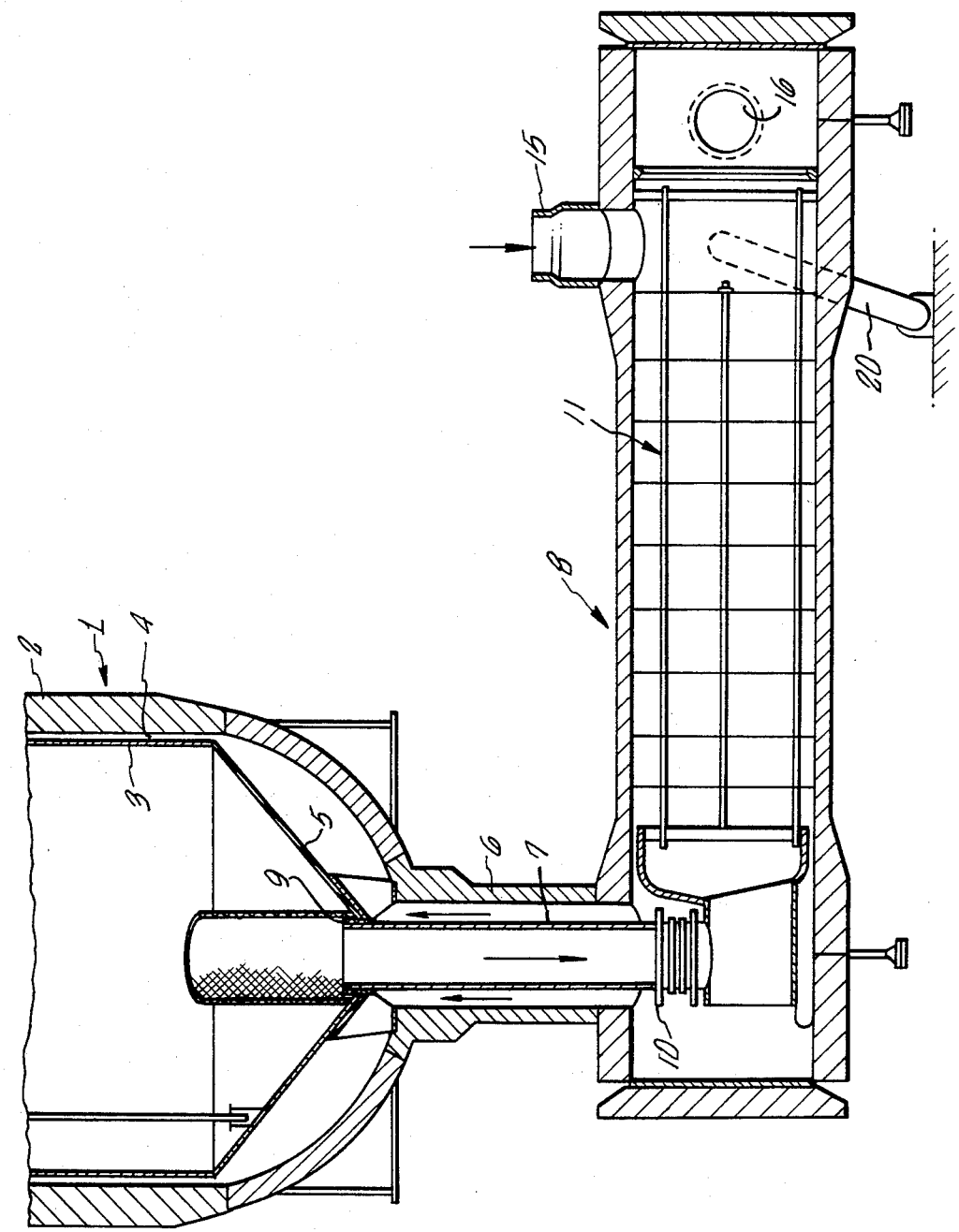

AMMONIA CONVERTER

BACKGROUND OF THE INVENTION

This invention relates generally as indicated to the synthesis of ammonia and more particularly to apparatus in which such synthesis may be advantageously carried out.

The synthesis of ammonia from natural gas occurs by a process in which natural gas, steam and air are combined in a series of well-known chemical reactions, culminating in a synthesis step. The synthesis reaction is conducted at high pressures and relatively moderate to high temperatures to obtain efficient conversion, since the rate of reaction is enhanced by higher temperatures. The equilibrium reaction, however, is enhanced by high pressure and low temperature and is significantly retarded by temperatures on the order of approximately 900° to 950° Fahrenheit. Because the synthesis reaction is exothermic, this is a significant consideration, as is the requirement for a minimum temperature of about 650° to 700° Fahrenheit to initiate the reaction, thus necessitating careful and accurate temperature control.

Moreover, since the synthesis reaction occurs at high pressure, the synthesis apparatus must be constructed in such a way and of such materials to stand prolonged use, at pressures, for example, of 2000 pounds per square inch or greater. To satisfy such requirements, a synthesis converter has previously been used which included a thick walled bottom forging adjacent the portion of the vessel containing the catalyst bed. The forging was fabricated from a material comprising an alloy of chromium and molybdenum. Over the course of time, however, it was found that the forging developed cracks which were hydrogen induced, resulting from the high temperature to which it was exposed and the many cycles that the forging was subjected to as a result of shut downs in operation.

Additionally, because the forging is positioned adjacent the catalyst bed, the exothermic synthesis reaction exposes the chromium alloy to temperatures on the order of 950° to 1000° Fahrenheit. It has been found that such temperatures cause the reaction between ammonia and the chromium-molybdenum alloy to proceed rapidly and form an objectional chrome-nitride layer along the interior surface of the forging.

Because the forging is subjected to high temperatures, it has been the practice to fabricate the forging from a 5% chromium-½% molybdenum alloy. However, 5% chromium alloys are not acceptable under the applicable codes for pressure vessel components in West Germany and consequently, the synthesis converter could not be used in that country.

A modified form of synthesis conversion apparatus which has also been utilized eliminated the thick walled bottom forging and bottom catalyst dump and replaced the same with an outlet elbow, which enabled the wall thickness to be reduced considerably since it was unnecessary to have integral reinforcement or a side outlet nozzle. Such apparatus, however, utilized an outlet fabricated of a material containing the aforedescribed 5-Cr-½-Mo alloy to withstand the temperatures to which the outlet was subjected. Hence, such apparatus suffers from the same limitations with respect to nitride and code as described above. Furthermore, such apparatus requires piping which operates at objectionable temperatures and at high pressures.

SUMMARY OF THE INVENTION

In light of the foregoing, it is a principal object of the present invention to provide apparatus for the synthesis of ammonia in which the aforenoted disadvantages are overcome. Thus, the invention comprises a synthesis converter which is adapted to be connected to a heat exchanger by a channel through which synthesis feed gas enters the converter. A relatively short conduit extends through the channel and is adapted to be connected at one end to a heat exchanger. In this arrangement, the length of the conduit and channel are such that the temperature of the feed gas stream to the synthesis converter does not exceed approximately 775° Fahrenheit. As a consequence, the channel may be fabricated of a material with a lower chromium content than 5-Cr-½-Mo alloy and this will meet code requirements internationally. Also, since the feed gas to the synthesis converter is at a lower temperature, the aforementioned nitriding problem is eliminated.

Another object of the present invention is to provide ammonia synthesis apparatus in which the pressure parts of the apparatus are not exposed to high temperature, while a further object is to provide an apparatus fabricated of materials of construction which are acceptable throughout the world.

Yet another object of this invention is to provide synthesis apparatus in which the length of piping is greatly reduced, thereby decreasing the problems of thermal expansion inherent in apparatus of this type where metallic surfaces are exposed to high temperatures, and also decreasing the costs of piping.

Other objects, features and advantages of this invention will be apparent to those skilled in the art after a reading of the following more detailed description.

DESCRIPTION OF THE PREFERRED EMBODIMENT

The FIGURE of drawing is an enlarged, partial section view of the synthesis apparatus of this invention close coupled to a heat exchanger.

As illustrated in the FIGURE of drawing, the synthesis apparatus 1 contains a shell 2 and catalyst holder 3 positioned within and spaced slightly from the shell to provide an annular passageway 4 therebetween. A channel 6 is provided at the lower end thereof adjacent the bottom 5 of the catalyst holder and a relatively short conduit 7 extends within the channel 6. The conduit 7 is connected to the lower end of the catalyst holder through a gas collector pipe 9 and to the tube side of the heat exchanger at 10 through an expansion means such as a packing joint or bellows, The channel 6 is relatively thin walled, and may be fabricated of alloys such as 2¼-Cr-1-Mo or 3-Cr-1-Mo, which are acceptable materials of construction internationally.

Since the conduit 7 is exposed to high temperature, as will be described, it is formed of high temperature resistant materials, e.g., nickel-chrome alloys such as those available from International Nickel Company under the "Incoloy" and "Inconel" trademarks, or stainless steel. Additionally, because the differential pressure between the interior of conduit 7 and within annular passageway 4 is only approximately 5%, the conduit may have a relatively thin wall; e.g., ½", which results in a reduction in weight for the apparatus and a significant reduction in cost.

In operation, the incoming ammonia synthesis feed gas will enter the inlet 15 of heat exchanger 8 at a temperature of approximately 525° to 550° Fahrenheit and pass through the shell side of the exchanger in heat exchange relationship with the hot effluent from the synthesis converter. The hot effluent passes from the catalyst holder of the converter through conduit 7 at a temperature of approximately 950° to 1000° Fahrenheit and into the tube side of the heat exchanger. When the feed gas enters the synthesis converter, it will have warmed to a temperature of approximately 700° to 750° Fahrenheit.

It should be noted that, due to the relatively short length of conduit 7, although some cooling of the hot effluent will inherently occur, it is not intended to function as a heat exchanger, but rather as a means of conveying the hot effluent from the lower end of the converter to the heat exchanger. In an alternative arrangement, if it is desired to help decrease somewhat the temperature of the hot effluent in Conduit 7, heat exchanger 8 may include a by-pass to direct a portion of the incoming ammonia synthesis feed gas from inlet 15 to an inlet (not shown) within the heat exchanger positioned closer to expansion means 10, whereby the gases passing around conduit 7 within channel 6 will be slightly cooler. After the effluent has passed through the heat exchanger, it exits at 16 at a temperature of approximately 750° Fahrenheit, and, in a typical synthesis process, since conversion is ordinarily not obtained in a single pass through a reactor, it may be passed to a second synthesis converter which may also be in close coupled relationship with a second heat exchanger utilizing the conduit and channel construction described and illustrated herein.

Conduit 7 must be sufficiently long to be able to fabricate the converter and heat exchanger in the field, that is to provide sufficient space for welding and other essential work to occur. By the same token, however, the conduit will be as short as possible, not only to reduce costs, but also to limit the amount of thermal expansion that must be taken up by expansion means, such as a packing joint or bellows where the conduit is connected to the heat exchanger (numeral 10 in the drawing), which will result from the difference in the coefficient of expansion between nickel-chrome alloys and chrome-alloys of conduit 7 and channel 6 respectively. The tube bundle 11 is anchored within the shell (not shown) to prevent offset, that is lateral expansion, which enables the apparatus to be constructed as described such that only vertical expansion must be compensated for. The length of the conduit is determined accordingly and usually will be between about one to six feet in length, with a length about three feet being a preferred form.

Because heat exchanger 8 is horizontally disposed, removal of the tube bundle for repair is considerably easier and enables the synthesis converter and exchanger to be constructed less expensively than if a vertically disposed exchanger were used. Also, to support the horizontally disposed exchanger 8 at the end opposite the synthesis converter, a spring loaded rocker arm depicted by numeral 20, is provided, to allow for longitudinal movement of the exchanger due to thermal expansion from the fixed end. The spring serves to resist the downward thrust of the nozzle and the rocker arm permits the described longitudinal movement of the exchanger.

It will be appreciated from the foregoing that an ammonia synthesis apparatus has been provided in which the pressure parts are not exposed to high temperature and only the feed gas at a much lower temperature is in contact with the high pressure channel of the heat exchanger and the synthesis converter, thereby overcoming the undesirable nitriding problems and reducing significantly the severity of the impact of hydrogen attacks. Furthermore, the apparatus herein provided has a synthesis converter close coupled through a channel to a heat exchanger, whereby the extensive piping typically utilized in prior arrangements, e.g., a heat exchanger fifteen feet from the converter, is eliminated, and the apparatus may be fabricated from materials which meet all applicable code requirements.

We claim:

1. An apparatus for synthesizing ammonia comprising:

a vertical synthesis converter comprising a shell and a catalyst holder positioned within and spaced slightly from the shell to provide an annular passageway;

a channel fabricated of a material selected from the group consisting of 2¼-Cr-1-Mo and 3-Cr-1-Mo provided at the lower end of the shell adjacent the bottom of the catalyst holder;

a conduit approximately 1 to about 6 feet in length fabricated of a nickel alloy or stainless steel extending through the channel and connected to the catalyst holder through a gas collector pipe;

a horizontally disposed shell and tube heat exchanger with a tube bundle anchored within the heat exchange shell at the end nearest the converter so as to prevent lateral movement of the tube bundle within the heat exchange shell, the heat exchange shell being close coupled through the channel to the converter, the conduit being connected to a tube side of the heat exchanger through an expansion means which will take up thermal expansion resulting from the difference in the coefficient of expansion between the conduit and the channel;

a spring-loaded rocker arm supporting the end of the heat exchanger opposite the converter, said rocker arm being provided to allow for longitudinal movement of the heat exchanger shell due to thermal expansion from the anchored end of said heat exchanger, whereby ammonia synthesis feed gas may pass through the heat exchanger and the channel about the conduit and into the synthesis converter at a temperature between approximately 700° F. to about 750° F. and the synthesis effluent passes through said conduit to the tube side of said heat exchanger at a temperature between approximately 950° F. to about 1000° F.

* * * * *